(12) United States Patent
Fujino et al.

(10) Patent No.: US 10,988,972 B2
(45) Date of Patent: Apr. 27, 2021

(54) GLASS PANEL

(71) Applicant: NIPPON SHEET GLASS COMPANY, LIMITED, Tokyo (JP)

(72) Inventors: Kazuya Fujino, Tokyo (JP); Tetsuo Minaai, Tokyo (JP); Tatsuhiro Nakazawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/761,730

(22) PCT Filed: Nov. 6, 2018

(86) PCT No.: PCT/JP2018/041178
§ 371 (c)(1),
(2) Date: May 5, 2020

(87) PCT Pub. No.: WO2019/093321
PCT Pub. Date: May 16, 2019

(65) Prior Publication Data
US 2020/0332588 A1     Oct. 22, 2020

(30) Foreign Application Priority Data
Nov. 10, 2017   (JP) .............. JP2017-217841

(51) Int. Cl.
*E06B 3/66* (2006.01)
*C03C 27/06* (2006.01)
*E06B 3/663* (2006.01)

(52) U.S. Cl.
CPC ............ *E06B 3/6612* (2013.01); *C03C 27/06* (2013.01); *E06B 3/663* (2013.01); *Y02A 30/249* (2018.01); *Y02B 80/22* (2013.01)

(58) Field of Classification Search
CPC ....... E06B 3/6612; E06B 3/663; Y02B 80/22; Y02A 30/249
See application file for complete search history.

(56) References Cited

U.S. PATENT DOCUMENTS 2,621,397 A * 12/1952 Black ..................... E06B 3/677
228/124.6
2,887,737 A *  5/1959 Prescott .................. C03C 27/10
65/43

(Continued)

FOREIGN PATENT DOCUMENTS

JP    H09-268035 A   10/1997
JP    2002-137940 A   5/2002

OTHER PUBLICATIONS

International Search Report issued in Application No. PCT/JP2018/041178, dated Feb. 5, 2019.

*Primary Examiner* — Donald J Loney
(74) *Attorney, Agent, or Firm* — Michael Best & Friedrich LLP (57) ABSTRACT

An object is to solve a strength problem around a suction hole on the gap side due to internal stress caused by a suction hole sealing metal material and depressurization, and provide a glass panel having enhanced safety. One glass plate 1A of a pair of glass plates 1A, 1B has a suction hole 4 penetrating the glass plate 1A in the front-back direction thereof, air in a gap V is sucked so as to depressurize the gap V, and the suction hole 4 is sealed by a suction hole sealing metal material 15. The suction hole sealing metal material 15 is solidified on the suction hole 4 so as to keep an airtight state, and is formed concentrically with the suction hole 4 in plan view, and the following Expression (1) is satisfied:

$$Dw \leq \{(Fc - 0.0361 Pd^2/Tg^{2.2})/\{(-0.0157 Tg + 0.1945) * Dg\}\} \quad (1)$$

(Continued)

where Fc is long-term permissible stress at a glass edge, Tg is a glass plate thickness (mm), Dw is a protruding portion diameter (mm) of the suction hole sealing metal material, Dg is a protruding portion thickness (mm) of the suction hole sealing metal material, and Pd is a spacer pitch (mm).

14 Claims, 8 Drawing Sheets

(56) References Cited

U.S. PATENT DOCUMENTS

| | | | | |
|---|---|---|---|---|
| 5,664,395 A | * | 9/1997 | Collins | E06B 3/6775 |
| | | | | 52/786.13 |
| 2013/0309425 A1 | * | 11/2013 | Dennis | E06B 3/6612 |
| | | | | 428/34 |

* cited by examiner

GLASS PANEL

TECHNICAL FIELD

The present invention relates to a glass panel including: a pair of glass plates; a gap formed by the pair of glass plates being disposed so as to be opposed to each other with a spacer interposed between the pair of glass plates; and a periphery sealing metal material joining the pair of glass plates at a peripheral portion thereof so as to make the gap airtight, wherein one glass plate of the pair of glass plates has a suction hole penetrating the one glass plate in a front-back direction thereof, and air in the gap is sucked so as to depressurize the gap, and the suction hole is sealed by a suction hole sealing metal material having a thermal expansion coefficient different from that of the pair of glass plates.

BACKGROUND ART

Conventionally, in such a glass panel as described above, some consideration has been made on pillar arrangement and the like, but no particular consideration has been made on strength calculation around the suction hole (see, for example, Patent Document 1). Meanwhile, various methods are used for sealing around the suction hole, but no particular consideration has been made on strength calculation around the suction hole (see, for example, Patent Document 2).

Incidentally, the present inventors have adopted, for sealing the suction hole, a method of, for example, dropping a suction hole sealing metal material from above the suction hole and thereby solidifying the suction hole sealing metal material, to keep the airtight state. The thermal expansion coefficient of the suction hole sealing metal material is greater than that of the glass plate, and therefore, it has been found that, by a reaction force due to thermal contraction of the suction hole sealing metal material, tensile stress occurs as internal stress around the suction hole on the gap side. In addition, when the gap between the glass plates is depressurized, the atmospheric pressure also causes tensile stress as internal stress around the suction hole on the gap side.

CITATION LIST

Patent Documents

[PATENT DOCUMENT 1] Japanese Laid-Open Patent Publication No. H09-268035

[PATENT DOCUMENT 2] Japanese Laid-Open Patent Publication No. 2002-137940

SUMMARY OF THE INVENTION

Problems to be Solved by the Invention

Accordingly, an object of the present invention is to solve a strength problem around a suction hole on the gap side due to internal stress caused by a suction hole sealing metal material and depressurization, and provide a glass panel having enhanced safety.

Solution to the Problems

In order to attain the above object, a glass panel according to the present invention includes: a pair of glass plates; a gap formed by the pair of glass plates being disposed so as to be opposed to each other with a spacer interposed between the pair of glass plates; and a periphery sealing metal material joining the pair of glass plates at a peripheral portion thereof so as to make the gap airtight, wherein one glass plate of the pair of glass plates has a suction hole penetrating the one glass plate in a front-back direction thereof, air in the gap is sucked so as to depressurize the gap and the suction hole is sealed by a suction hole sealing metal material having a thermal expansion coefficient different from that of the pair of glass plates, the suction hole sealing metal material keeps an airtight state on the suction hole, the suction hole sealing metal material is formed concentrically with the suction hole in plan view, and the following Expression (1) is satisfied:

$$Dw <= (Fc - 0.0361 Pd^2/Tg^{2.2})/\{(-0.0157Tg+0.1945)*Dg\} \quad (1)$$

where Fc is long-term permissible stress at a glass edge, Tg is a glass plate thickness (mm), Dw is a protruding portion diameter (mm) of the suction hole sealing metal material, Dg is a protruding portion thickness (mm) of the suction hole sealing metal material, and Pd is a spacer pitch (mm).

Here, according to experiment by the present inventors, first tensile stress Fa occurring in the suction hole sealing metal material and second tensile stress Fb occurring on the gap side around the suction hole due to depressurization are represented by the following Expressions (1a), (b), respectively.

$$Fa = (-0.0157Tg+0.1945)*Dw*Dg \quad (1a)$$

$$Fb = 0.0361 Pd^2/Tg^{2.2} \quad (1b)$$

The sum of the first tensile stress Fa and the second tensile stress Fb needs to be smaller than long-term permissible stress at the glass edge, and thus Expression (1) is obtained using Expressions (1a), (1b).

With the above Expression (1), the protruding portion diameter Dw is appropriately adjusted so that the sum of the first tensile stress Fa and the second tensile stress Fb is kept smaller than the long-term permissible stress Fe at the glass edge, whereby breakage of the glass due to stress concentration can be prevented.

Further, in the above configuration, it is desirable that the protruding portion diameter Dw of the suction hole sealing metal material is fixed, and is set so as to satisfy the following Expression (2):

$$Dg <= (Fc - 0.0361 Pd^2/Tg^{2.2})/\{(-0.0157Tg+0.1945)*Dw\} \quad (2).$$

Thus, the protruding portion thickness Dg is appropriately adjusted, whereby, as in the above, breakage of the glass due to stress concentration can be prevented.

Further, in addition to each of the above configurations, it is desirable that first tensile stress Fa is set so as to satisfy the following Expression (3):

$$Fa = (-0.0157Tg+0.1945)*Dw*Dg <= 5 \text{ MPa} \quad (3).$$

According to P. 16 of the recommended standards by Flat Glass Manufacturers Association of Japan (issued in August, 2003), the long-term permissible stress Fc at the glass edge in the case of float glass is 7 MPa (6.9 MPa rounded off). In addition, according to calculation by the present inventors in embodiments, the second tensile stress Fb is 2 MPa. Therefore, 7 MPa−2 MPa=5 MPa is obtained, so that the above Expression (3) is satisfied.

Further, in addition to each of the above configurations, it is desirable that first tensile stress Fa is set so as to satisfy the following Expression (4):

$$Fa = (-0.0157Tg+0.1945)*Dw*Dg <= 3 \text{ MPa} \quad (4).$$

This is obtained as a result of setting the safety factor to less than 2 and considering variation in stress.

Further, in the above configurations, the suction hole sealing metal material 15 may be solidified by being dropped from above the suction hole, to keep the airtight state.

With this configuration, the suction hole sealing metal material 15 closely adheres to the glass surface, and further can flow into the suction hole 4.

From the above relationships, depending on the settings of the glass plate thickness Tg, the pillar interval Pd, and the diameter Dw and the thickness Dg of the protruding portion 16, a risk of damage due to internal stress around the suction hole 4 can be reduced.

Further, in each of the above configurations, the spacer may be composed of a plurality of pillars interposed in a matrix form at a predetermined pitch Pd so as to keep a predetermined interval between the pair of glass plates, and the pillars may be arranged at a narrower pitch in a vicinity of the suction hole than a pitch at another part.

With this configuration, the pillar interval is narrowed, whereby the second tensile stress Fb occurring on the gap side around the suction hole due to the depressurization is reduced.

For the same reason, the spacer may be composed of a plurality of pillars interposed in a matrix form at a predetermined pitch so as to keep a predetermined interval between the pair of glass plates, and at least one other pillar different from the plurality of pillars may be provided closer to the suction hole than the plurality of pillars.

Further, in addition to each of the above configurations, it is desirable that a width of the periphery sealing metal material as seen in a thickness direction with respect to a plane of the glass panel is 1 to 10 mm.

Further, in addition to each of the above configurations, it is desirable that a thickness of at least one of the pair of glass plates is 0.3 to 15 mm.

Further, in addition to each of the above configurations, it is desirable that a width of the protruding portion is 2 to 30 mm.

Further, in addition to each of the above configurations, it is desirable that a thickness of the protruding portion is 0.1 to 20 mm.

Further, in addition to each of the above configurations, it is desirable that a pitch of the spacer is 5 to 100 mm.

Further, in addition to each of the above configurations, it is desirable that a diameter of the suction hole is 2 to 10 mm.

Further, in addition to each of the above configurations, it is desirable that at least a gap-side edge portion of the suction hole is formed in a curved-surface shape or is chamfered.

Advantageous Effects of the Invention

Thus, the above configurations of the glass panel according to the present invention make it possible to solve a strength problem around the suction hole on the gap side due to internal stress caused by the suction hole sealing metal material and depressurization, and provide the glass panel having enhanced safety.

Other objects, configurations, and effects of the present invention will become apparent from the description of embodiments of the present invention shown below.

DESCRIPTION OF EMBODIMENTS

Hereinafter, embodiments of the present invention will be described with reference to the drawings.

Figure 1:
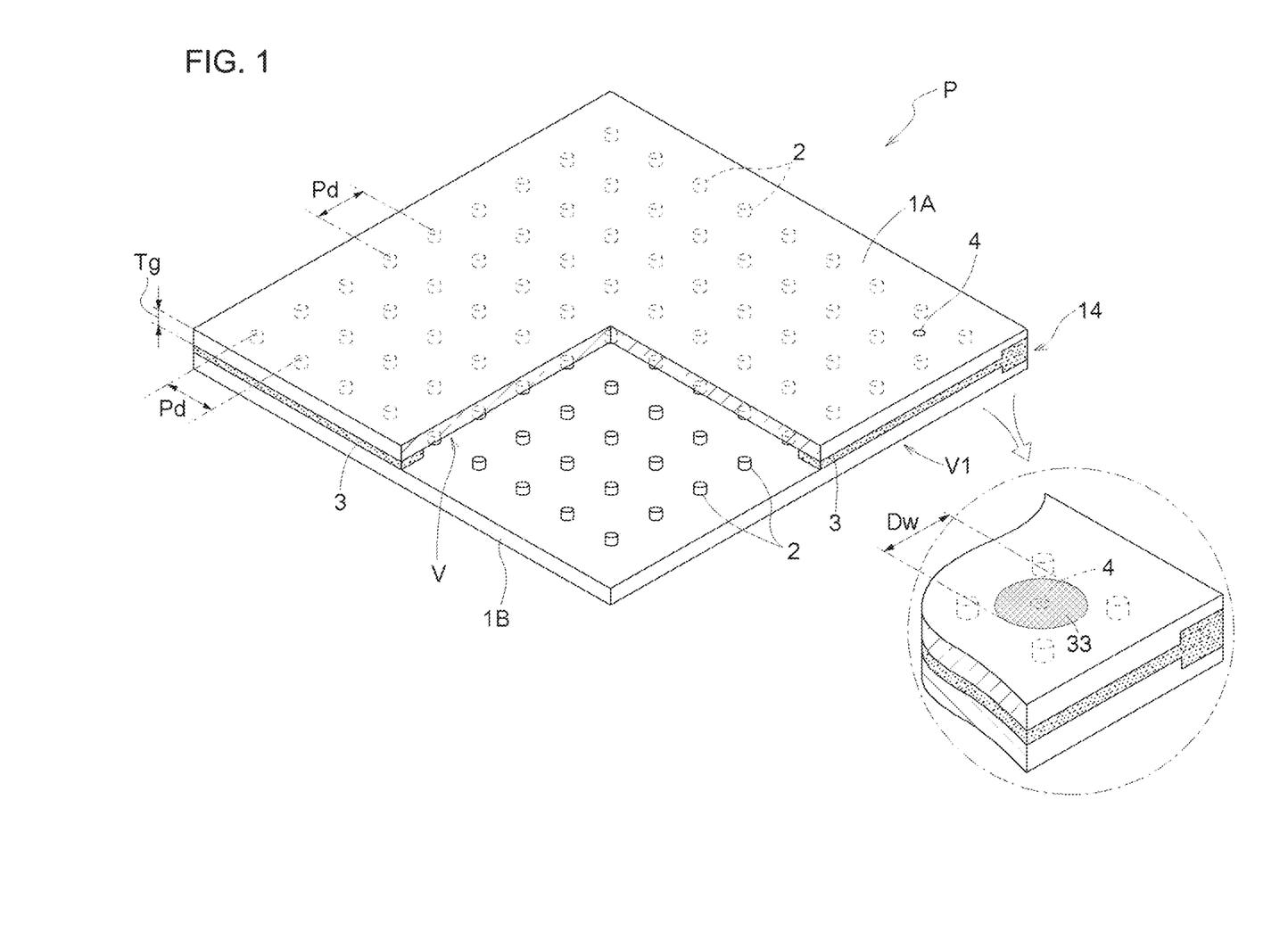
FIG. 1 is a partially cutaway perspective view of a glass panel.
Figure 2:
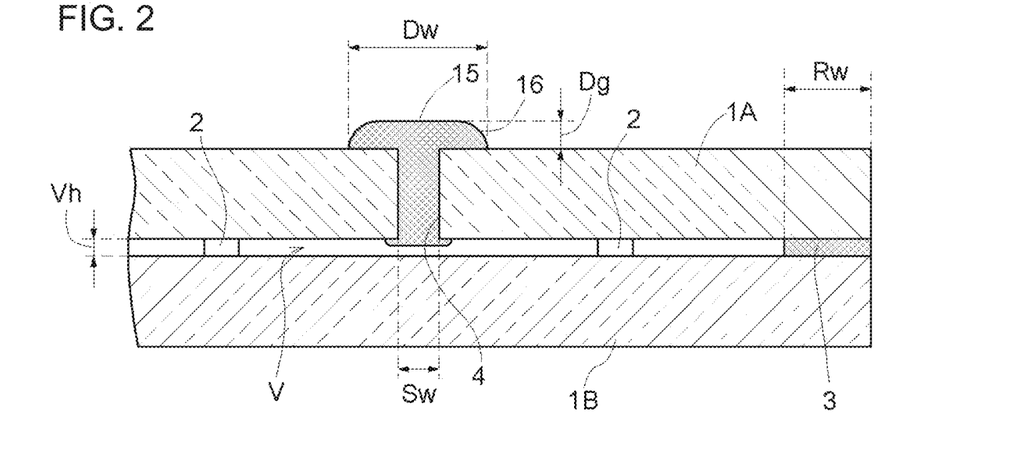
FIG. 2 is a vertical sectional view around a suction hole of the glass panel.

In FIG. 1, a glass panel P includes a pair of glass plates 1A, 1B opposed to each other, a gap V formed by a plurality of columnar spacers 2 being provided at a constant spacer pitch Pd in a matrix form between the pair of glass plates 1A, 1B, a periphery sealing metal material 3 sealing a peripheral portion V1 of the gap V, and a suction hole 4 penetrating one glass plate 1A of the pair of glass plates 1A, 1B. The suction hole 4 is sealed by a suction hole sealing metal material 15 covering the suction hole 4 including a surrounding area thereof.

In the glass panel P, the two glass plates 1A, 1B are transparent float glass, and the gap V is depressurized to 1.33 Pa ($1.0 \times 10^{-2}$ Torr) or lower. Here, the gap V is depressurized by discharging the inside air through the suction hole 4, and is sealed by the periphery sealing metal material 3 and the suction hole sealing metal material 15 in order to maintain the depressurized state of the gap V.

Each spacer 2 has a columnar shape, and has a diameter of approximately 0.3 to 1.0 mm and a height of approximately 30 μm to 1.0 mm. The spacer 2 is made from a material that does not buckle even when being subjected to compressive stress due to the atmospheric pressure applied to the glass plates 1A, 1B, e.g., a material having a compressive strength of $4.9 \times 10^8$ Pa ($5 \times 10^3$ kgf/cm$^2$) or greater, and preferably, stainless steel (SUS304) or the like.

Figure 3:
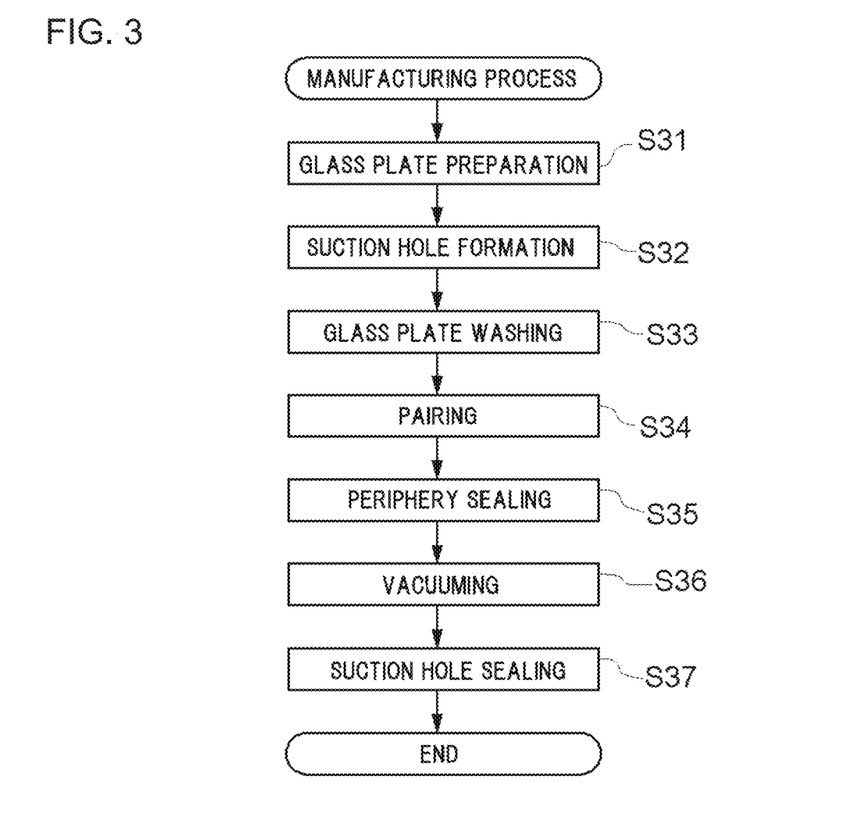
FIG. 3 is a flowchart showing a method for manufacturing the glass panel.

FIG. 3 is a flowchart showing a method for manufacturing the glass panel P shown in FIG. 1.

First, two glass raw plates (not shown) made from float glass and having a predetermined thickness are each cut in predetermined dimensions, e.g., 1200 mm×900 mm, to prepare the glass plates 1A, 1B having the same shape and the same size (step S31), and the glass plate 1A is perforated in the vicinity of one of the four corners thereof by a drill or the like, to form the suction hole 4 (step S32) (perforation step).

Next, in a space such as a clean room or a chemical clean room in which the contamination state of air can be chemically or physically controlled, the pair of glass plates 1A, 1B are cleaned using at least one of pure water brush cleaning, a liquid cleaning method, and optical cleaning (step S33) (cleaning step). In this liquid cleaning method, pure water, deionized water, or the like is used. In addition, a cleaning liquid contains an alkaline detergent or ozone water, for example. In addition, the cleaning liquid may contain a polishing agent. As the polishing agent, for example, fine particles containing cerium oxide as a main component are used.

On the glass plate 1B which has no suction hole 4 and has been cleaned, a plurality of spacers 2 are arranged at a constant spacer pitch Pd in a matrix form, and the cleaned glass plate 1A is overlaid thereon, whereby the glass plates 1A, 1B are paired (step S34).

Further, while the paired glass plates 1A, 1B are kept substantially horizontal, the peripheral portion V1 of the pair of glass plates 1A, 1B is sealed using the periphery sealing metal material 3 having a melting temperature of 250° C. or lower (step S35) (periphery sealing).

Figure 4:
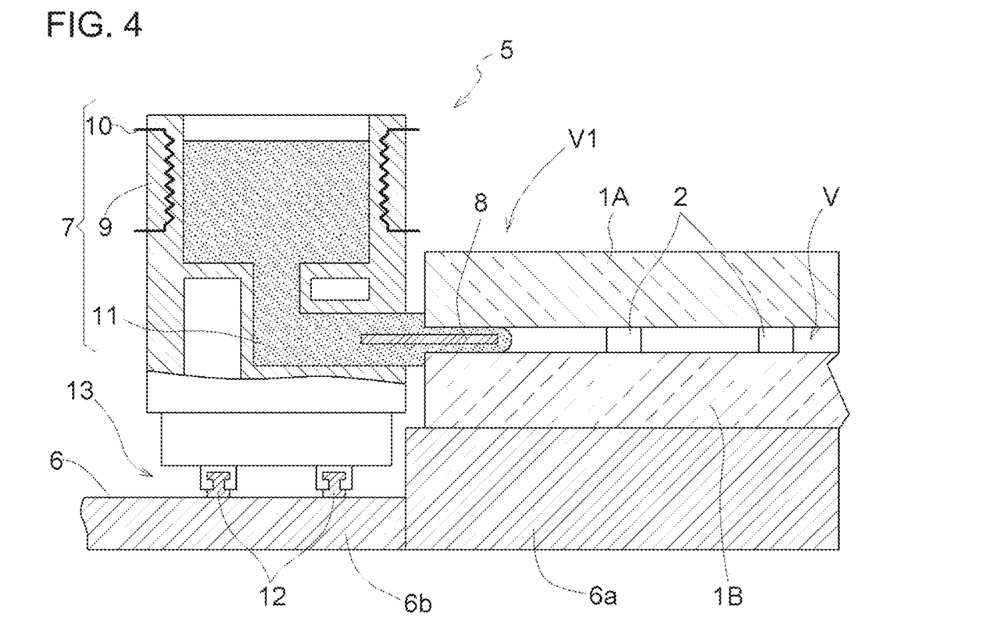
FIG. 4 is a major part vertical sectional view showing a periphery sealing step.

FIG. 4 is a view used for explaining the periphery sealing in step S35 in FIG. 3.

In FIG. 4, a metal introduction device 5 has a surface plate 6 having a high portion 6a and a low portion 6b lower than the high portion 6a so as to be formed in a step shape. The pair of glass plates 1A, 1B are retained on the high portion 6a, and a supply tower 7 for supplying solder to the pair of glass plates 1A, 1B is retained on the low portion 6b. On the low portion 6b of the stepped surface plate 6, two rail members 12 are arranged along the pair of glass plates 1A, 1B, and the supply tower 7 is placed on a movement mechanism 13 which moves on the rail members 12.

The supply tower 7 includes a crucible portion 9 which stores solder in liquid phase or solid phase and has a rectangular cross-section, an electric heater 10 which is provided inside a side wall portion of the crucible portion 9 and heats solder stored in the crucible portion 9, an introduction path 11 which has an elongated sectional shape and which communicates with a bottom portion of the crucible portion 7 and opens toward an outer side of the peripheral portion V1 of the pair of glass plates 1A, 1B, and an introduction plate 8 provided horizontally at a middle level in the introduction path 11. The introduction plate 8 extends from the introduction path 11, to be inserted into the peripheral portion VT of the pair of glass plates A, 1B. Thus, solder moves into the gap V with the aid of the surface tension thereof. In addition, the weight of solder at a liquid level ΔH in the crucible portion 9 is applied to solder at the introduction plate 8 part, thereby promoting the solder to move into the peripheral portion V1 of the pair of glass plates 1A, 1B.

Figure 5:
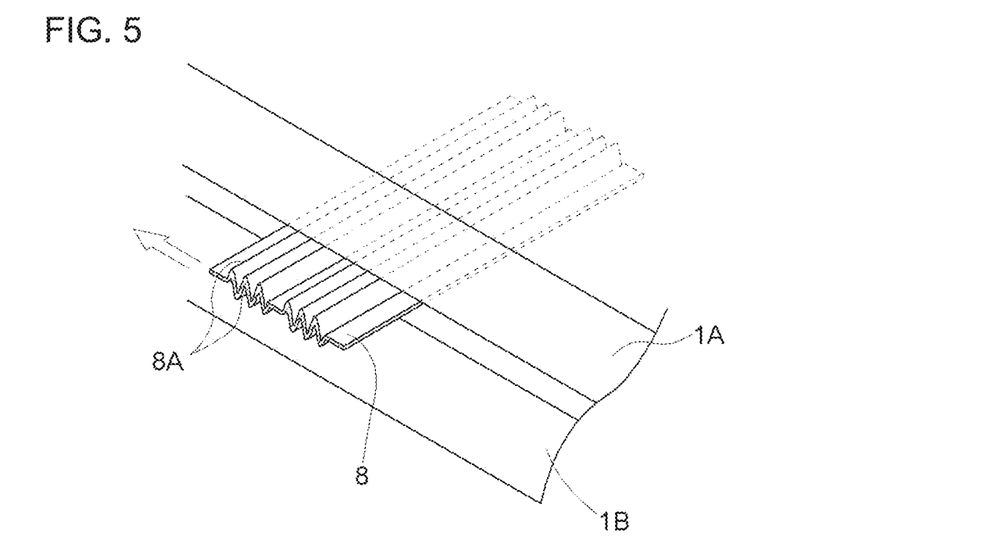
FIG. 5 illustrates an action of an introduction plate.

In addition, as shown in FIG. 5, the introduction plate 8 may have such a shape that bent portions 8A each waved up and down a plurality of times along the movement direction thereof are formed at two locations with a space therebetween (bellows shape).

That is, when the introduction plate 8 having the bent portions 8A moves, the bent portions 8A having a spring effect slightly rubs the surface of the glass plates, so that adhesion of solder to the glass surfaces is enhanced, thus providing an effect of reliably ensuring airtightness of the gap V.

In addition, the introduction plate 8 may have a bow shape providing a spring effect, or may have a planar shape having no bent portions. However, for the above reason, the introduction plate 8 having the bent portions 8A is more advantageous.

Meanwhile, the movement mechanism 13 moves at a constant speed on the rail members 12 along the peripheral portion V1 of the pair of glass plates A, 1B. Therefore, with the introduction plate 8 inserted into the gap V from an opened end part 14 of the pair of glass plates 1A, 1B, the periphery sealing metal material 3 moves into the entire area of the peripheral portion V1 of the pair of glass plates 1A, 1B via the introduction plate 8. Thus, the peripheral portion V1 of the gap V formed between the pair of glass plates 1A, 1B is sealed in an airtight state by the periphery sealing metal material 3.

Figure 6:
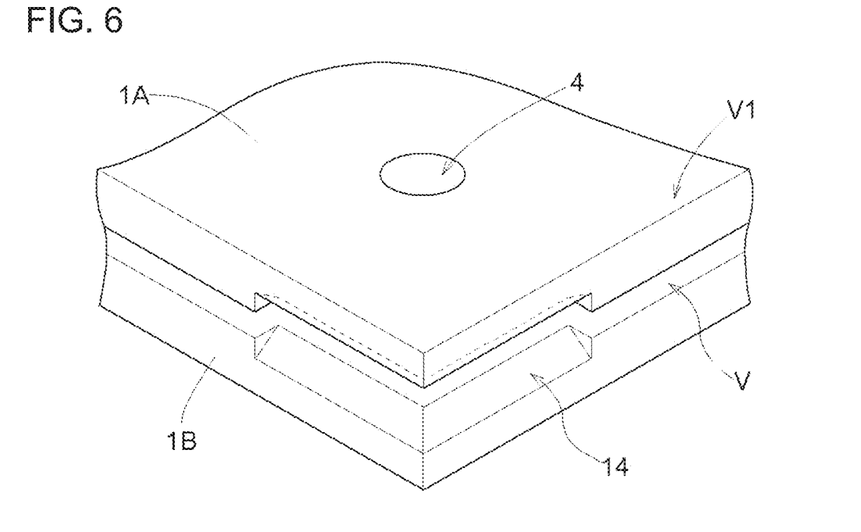
FIG. 6 is an enlarged view around the suction hole before sealing of the suction hole.

As shown in FIG. 6, the opened end part 14 is provided at a corner of the glass panel P, and is formed by chamfering gap-V-side corner portions of the pair of glass plates A, 1B so as to facilitate insertion of the introduction plate 8 into the gap V.

In subsequent step S36, in the vicinity of the suction hole 4, an exhaust cup is attached to the atmospheric-side main surface of the glass plate 1A so as to cover the suction hole 4, and vacuuming is performed in which gas molecules in the gap V are discharged to outside so as to reduce the pressure of the gap V to 1.33 Pa or lower through suction by a rotary pump or a turbomolecular pump (not shown) connected to the exhaust cup (step S36).

It is noted that the pump used in this step is not limited to the above-described rotary pump or turbomolecular pump, but may be any pump that can be connected to the exhaust cup and can perform suction.

Next, the suction hole sealing metal material 15 is dropped so as to overlay the suction hole 4, whereby the glass surface in the vicinity of the suction hole 4 and the suction hole sealing metal material 15 are adhered to each other to make sealing (step S37).

Thus, the gap V formed between the pair of glass plates 1A, 1B is sealed up.

It is noted that, among the above steps, the steps from cleaning of the main surfaces of the pair of glass plates 1A, 1B (step S33) to sealing by adhering the glass surface in the vicinity of the suction hole 4 and the suction hole sealing metal material 15 (step S37) are each performed in a space in which the contamination state of the air can be chemically or physically controlled.

In the present embodiment, the pair of glass plates 1A, 1B are cleaned using the liquid cleaning method. However, without limitation thereto, the pair of glass plates 1A, 1B may be cleaned using at least one of a pure water brush cleaning method, an ultrasonic cleaning method, an alkaline water cleaning method, a heating cleaning method, a vacuum (frozen) cleaning method, a UV cleaning method, an ozone cleaning method, and a plasma cleaning method. Thus, occurrence of gas molecules that can be decomposed or scattered from the main surfaces of the pair of glass plates 1A, 1B can be suppressed, and therefore the initial performance of the glass panel P can be exhibited over a long period.

In the present embodiment, as the periphery sealing metal material 3, solder having a melting temperature of 250° C. or lower, e.g., solder obtained by adding Ti to solder having a composition of 91.2Sn-8.8Zn (eutectic temperature: 198° C.) is used to seal the peripheral portion V1 of the pair of glass plates 1A, 1B. However, the periphery sealing metal material 3 (solder) is not limited thereto. The peripheral portion V1 of the pair of glass plates 1A, 1B may be sealed using a sealing material that has a melting temperature of 250° C. or lower and that is a metal material including at least one material selected from a group consisting of Sn, Cu, In, Bi, Zn, Pb, Sb, Ga, and Ag.

In addition, the periphery sealing metal material 3 may include, instead of Ti or in addition to Ti, at least one material selected from a group consisting of Al, Cr, and Si. This can improve adhesion between the periphery sealing metal material 3 and the glass component of the pair of glass plates 1A, 1B.

In the present embodiment, as the suction hole sealing metal material 15, solder having a melting temperature of 250° C. or lower, e.g., solder obtained by adding Ti to solder having a composition of 91.2Sn-8.8Zn (eutectic temperature: 198° C.) is used to seal the suction hole 4. However, the suction hole sealing metal material 15 (solder) is not limited thereto. The suction hole 4 may be sealed using a sealing material that has a melting temperature of 250° C. or lower and that is a metal material including at least one material selected from a group consisting of Sn, Cu, In, Bi, Zn, Pb, Sb, Ga, and Ag.

It is noted that, in the case of selecting Sn, it suffices that the amount thereof is 90% or higher, and in the case of Sn with Cu added thereto, the amount of Cu needs to be 0.1% or lower.

In addition, the suction hole sealing metal material 15 may include, instead of Ti or in addition to Ti, at least one material selected from a group consisting of Al, Cr, and Si.

Further, as the suction hole sealing metal material 15, solder having a component different from the periphery sealing metal material 3 may be used.

It is noted that containing Ti (titanium) in the suction hole sealing metal material 15 or the periphery sealing metal material 3 improves close adhesion to glass.

In the present embodiment, the pressure of the gap V is reduced to 1.33 Pa or lower. However, without limitation thereto, the pressure of the gap V may be reduced to reach almost a vacuum. This can further enhance thermal insulation performance of the glass panel P.

In the present embodiment, the lower limit of a thickness Tg of each of the pair of glass plates is 0.3 mm or greater. In addition, the lower limit is preferably 0.5 mm or greater. Further preferably, the lower limit is 1 mm or greater. If the thickness Tg of each of the pair of glass plates is small, the heat storage capacity of the glass itself becomes small. Therefore, at the time of periphery sealing, the amount of heat dissipation to the air per unit time increases, so that the periphery sealing metal material 3 is more readily cooled. Thus, solidification of the melted periphery sealing metal material 3 can be promoted. However, if the glass plate is thinned, rigidity of the glass plate reduces, and thus the amount of deformation of the glass plate due to the same magnitude of external force increases. Therefore, in the glass panel P, tensile stress occurring in the vicinity of a gap-side surface of the suction hole 4 increases.

The upper limit of the thickness Tg of each of the pair of glass plates is 15 mm or less. Preferably, the upper limit is 12 mm or less. Further preferably, the upper limit is 10 mm or less. In the case of using a thick glass plate, rigidity of the glass plate increases, and thus the amount of deformation of the glass plate due to the same magnitude of external force decreases. Therefore, in the glass panel P, tensile stress occurring in the vicinity of a gap-side surface of the suction hole 4 reduces, and thus long-term durability is improved. On the other hand, if the glass plate thickness Tg increases, the amount of the suction hole sealing metal material 15 flowing into the suction hole 4 at the time of sealing the suction hole is decreased. Thus, protrusion of the suction hole sealing metal material 15 on the gap side is reduced, so that it becomes difficult to relax tensile stress occurring in the vicinity of the gap-side surface of the suction hole 4.

The pair of glass plates 1A, 1B are float glass, but are not limited thereto. In accordance with the intended usage as described above, various types of glass such as figured glass, frosted glass having a light diffusing function due to surface treatment, wire mesh glass, a wire glass plate, tempered glass, double-tempered glass, low-reflection glass, high-transmission glass plate, a ceramic glass plate, special glass having a function of absorbing heat rays or ultraviolet rays, or a combination thereof, can be appropriately selected and used as the pair of glass plates 1A, 1B.

Further, also regarding the composition of the pair of glass plates 1A, 1B, soda silicate glass, soda-lime glass, borosilicate glass, aluminosilicate glass, various crystallized glasses, or the like can be used.

In the present embodiment, the opened end part 14 is formed by chamfering gap-V-side corner portions of the glass plates 1A, 1B in a planar shape. However, without limitation thereto, any shape that allows the introduction plate 8 to be easily inserted, e.g., curved-surface chamfers, can be appropriately selected and provided to the glass plates 1A, 1B.

In the present embodiment, the spacer pitch Pd is 5 to 100 mm, preferably 5 to 80 mm, and further preferably 5 to 60 mm.

In addition, the spacer 2 is formed from stainless steel, but is not limited thereto. The spacer 2 may be formed from a high-rigidity material, e.g., Inconel, metal such as iron, aluminum, tungsten, nickel, chromium, or titanium, an alloy such as carbon steel, chrome steel, nickel steel, nickel chrome steel, manganese steel, chrome manganese steel, chrome molybdenum steel, silicon steel, brass, solder, or duralumin, ceramic, glass, etc. In addition, the shape of the spacer 2 is not limited to a columnar shape, but may be various shapes such as an angled shape or a spherical shape.

In the present embodiment, a gap height Vh is 30 μm to 1 mm. It is noted that the gap height Vh is substantially the same as the height of the spacer 2.

It is noted that, in the gap V, an evaporable getter may be used for adsorbing gas molecules in the gap V, a non-evaporable getter which adsorbs and removes gas molecules by being heated and activated may be used, or a non-evaporable getter and an evaporable getter may be used in combination. In addition, in the gap V, getter materials (adsorbents) and adsorbent storage holes may be provided at two or more locations.

In the present embodiment, the periphery sealing metal material 3 is formed using the metal introduction device 5, but another method may be used. The periphery sealing metal material 3 may be formed using at least one joining method of anodic bonding, ultrasonic welding, multistage welding, laser welding, and pressure bonding. Thus, adhesion of the periphery sealing metal material 3 to the pair of glass plates 1A, 1B can be improved.

In addition, a width Rw of the periphery sealing metal material 3 as seen in the thickness direction with respect to the plane of the glass panel P is not less than 1 mm and not greater than 10 mm. If the width Rw is less than 1 mm, it is difficult to keep the sealing of the gap V of the glass panel P. In addition, if the width Rw is greater than 10 mm, the amount of heat exchange occurring through the periphery sealing metal material 3 becomes excessive. Further preferably, the width Rw is not less than 1 mm and not greater than 5 mm. In this case, it is possible to keep the sealing of the gap V of the glass panel P and in addition, reduce the amount of heat exchange.

In the present embodiment, a part of the suction hole sealing metal material 15 that protrudes from the atmospheric-side surface of the glass plate 1A after sealing is referred to as a protruding portion 16. A protruding portion diameter Dw (which is the same as the width of a contact portion 33 in contact with the glass plate A in FIG. 1) of the protruding portion 16 is 2 to 30 mm. Further preferably, the protruding portion diameter Dw is 2 to 15 mm. It is noted that, in any case, the protruding portion diameter Dw is greater than a suction hole diameter Sw.

In addition, a protruding portion thickness Dg of the protruding portion 16 is 0.1 to 20 mm. Preferably, the protruding portion thickness Dg is 0.1 to 10 mm.

It is noted that the larger the contact surface between the protruding portion 16 and the glass plate 1A is, the greater the contraction stress that occurs is. In addition, the smaller the protruding portion diameter Dw is, the greater the difficulty in accurately sealing the suction hole 4 is.

In the present embodiment, the suction hole diameter Sw is 2 to 10 mm. Preferably, the suction hole diameter Sw is 2 to 5 mm. In the case of tempered glass, it is desirable that the suction hole diameter Sw is greater than the glass thickness and is not greater than 10 mm. This is for passing air through the suction hole 4 at the time of air-quenching tempering.

In addition, at least a lower edge portion of the suction hole 4 may be formed in a curved-surface shape or may be chamfered (a minute surface may be provided at the edge portion).

Figure 7:
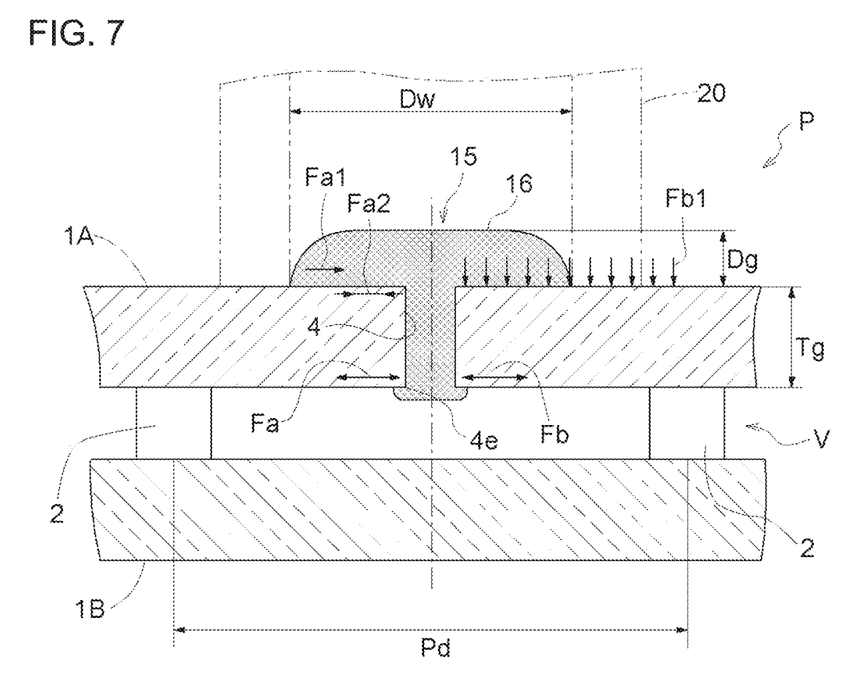
FIG. 7 is an enlarged vertical sectional view around the suction hole of the glass panel.
Figure 11:
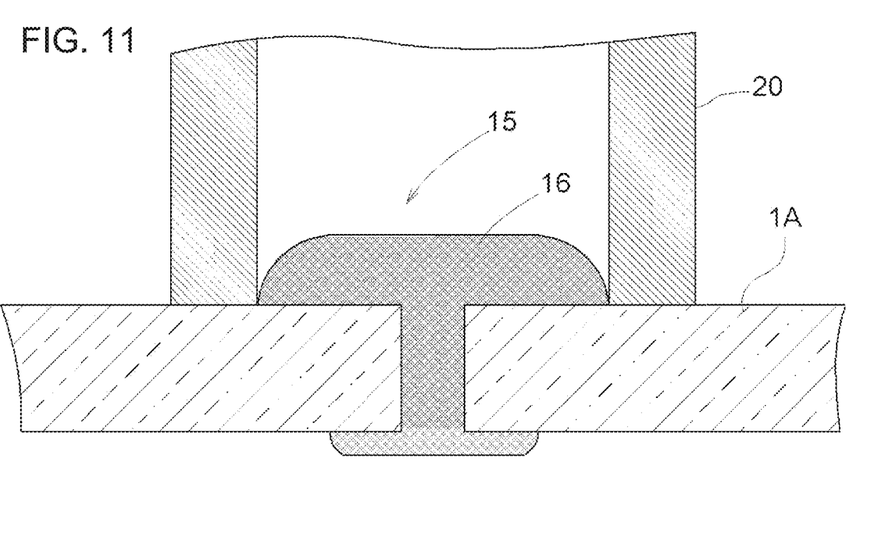
FIG. 11 is a partial enlarged sectional view of FIG. 7.

Hereinafter, with reference to FIG. 7 and FIG. 11, the relationship between sealing of the suction hole and stress will be described with reference to FIG. 7 and FIG. 11. The suction hole sealing metal material 15 drops due to the own weight through the inside of the guide cylinder 20, by a mass of solder provided at an upper part of a supply port, a heater for heating and melting the solder, and a dropping device for dropping the melted suction hole sealing metal material 15. The melted suction hole sealing metal material 15 spreads on the atmospheric-side surface of the glass plate 1A to form the protruding portion 16 along the inner circumference of the guide cylinder 20.

In the protruding portion 16 of the suction hole sealing metal material 15, solder contraction stress Fa1 occurs due to cooling. However, the thermal expansion coefficient (e.g., in the case of float glass, generally 8 to 9×10$^{-6}$/° C. (ordinary temperature to 350° C.)) of the glass plate 1A is smaller than the thermal expansion coefficient (e.g., in the present embodiment, 24×10$^{-6}$/° C.; in the case of normal solder, approximately 15×10$^{-6}$/° C. to 30×10$^{-6}$/° C.) of the suction hole sealing metal material 15. Therefore, upper part compressive stress Fa2 occurs. A reaction force to the upper part compressive stress Fa2 occurs as first tensile stress Fa (shearing force) in the vicinity of an edge 4e of the suction hole 4 on the gap side.

Incidentally, in the case of vacuum glass sealed by frit, there is no thermal expansion difference between glass and frit, and therefore, even if the sealing temperature is high (500° C.), influence of stress is small. Thus, it suffices that strength designing (for glass thickness Tg and pillar interval Pd) is made in consideration of the atmospheric pressure.

However, as compared to frit, solder has poor wettability with glass, so that a large volume of solder is needed for sealing. It has been newly found that stress occurs depending on the volume (Dg and Dw) and therefore this needs to be taken into consideration for strength designing, leading to introduction of the first tensile stress Fa.

That is, it has been found that, in the case of performing sealing with solder at high temperature, thermal expansion difference is great and thus the sealing is impossible, but in a temperature range of 250° C. or lower, the sealing can be performed.

For example, a temperature range of 180° C. to 250° C., which is the melting temperature of general tin (Sn) solder, or a thermal expansion coefficient of 15 to 30×10$^{-6}$/° C., is applicable.

The spacers 2 are arranged at constant intervals Pd (spacer pitch) in a matrix form along the planes of the pair of glass and plates 1A, 1B. The spacers 2 form the gap V and hamper heat conduction between the pair of glass plates 1A, 1B. An atmospheric pressure Fb1 is applied to the glass plates 1A, 1B supported by the spacers 2, so that second tensile stress Fb occurs on the gap V side of the glass plate 1A.

These tensile stresses are summed as internal stress, so that stress concentration possibly occurs on the edge 4e of the suction hole 4 on the gap side. Therefore, the summed stress at this part needs to be not greater than long-term permissible stress (defined as Fc) in the glass edge.

Figure 8A:
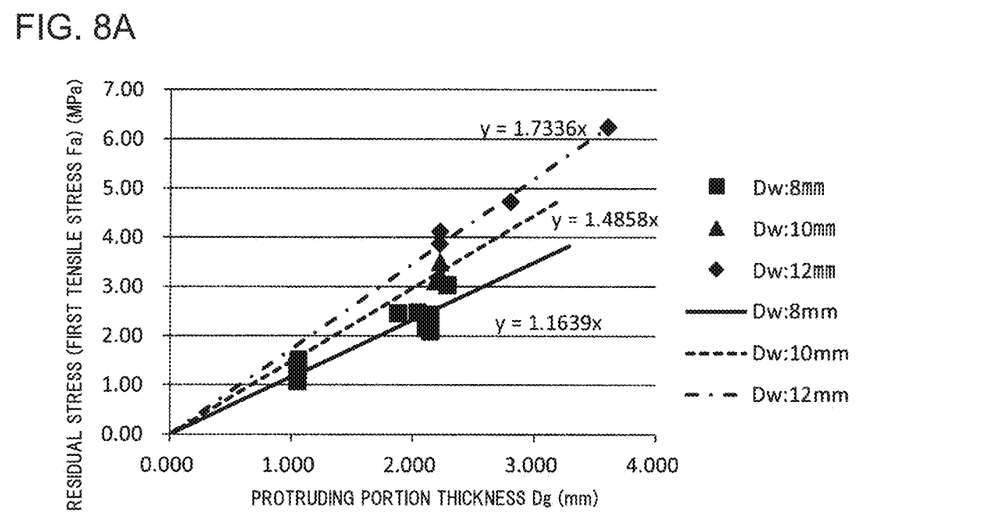
FIG. 8A is a graph showing the correlation between a protruding portion thickness Dg and first tensile stress Fa in experiment regarding first tensile stress Fa.
Figure 8B:
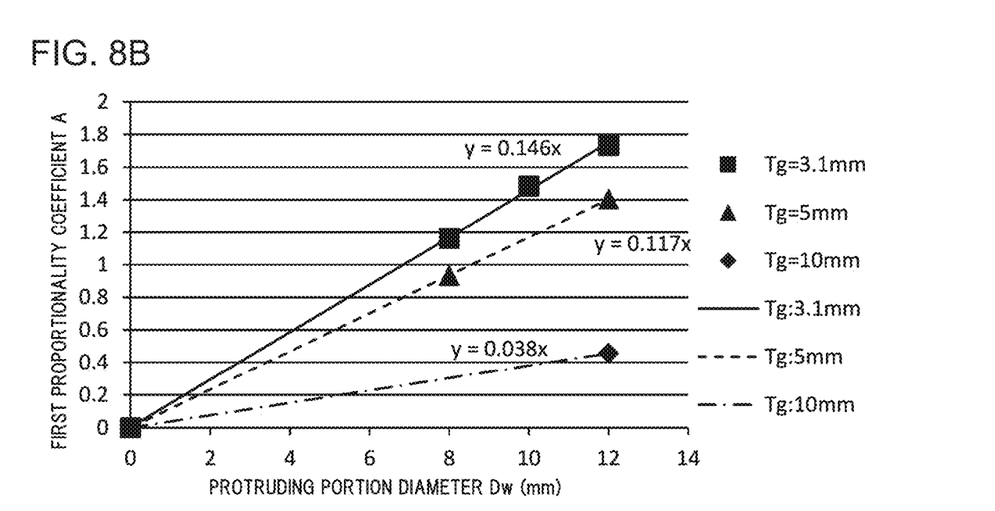
FIG. 8B is a graph showing the correlation between a protruding portion diameter Dw and a first proportionality coefficient A in experiment regarding first tensile stress Fa.
Figure 8C:
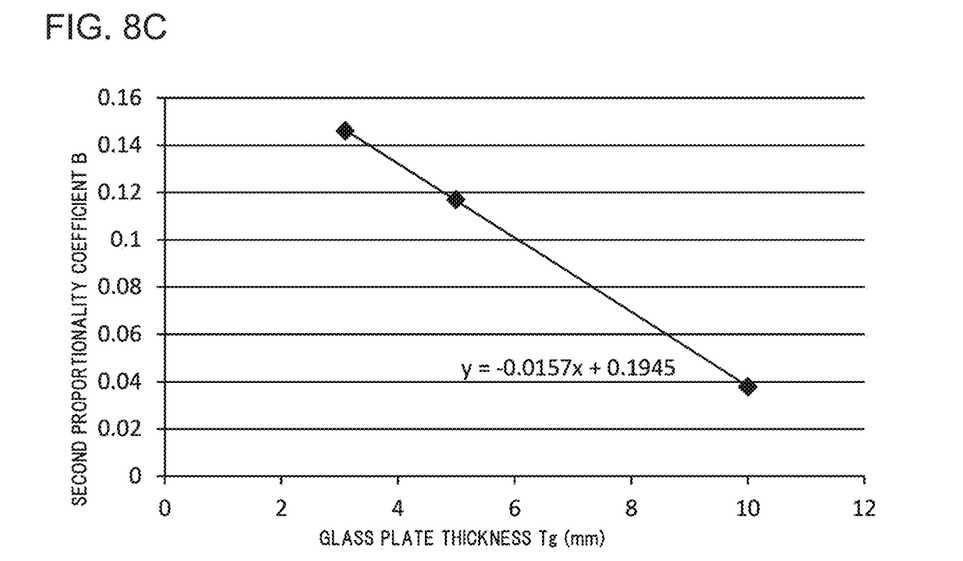
FIG. 8C is a graph showing the correlation between a glass plate thickness Tg and a second proportionality coefficient B in experiment regarding first tensile stress Fa.

FIGS. 8A to 8C are graphs made on the basis of a result of experiment conducted using suction hole sealing metal materials 15 having protruding portion diameters Dw of 8, 10, 12 mm, and numerical values derived from the result.

FIG. 8A is a graph obtained by plotting values of the protruding portion thickness Dg and values of the first tensile stress Fa corresponding thereto. Further, these plotted points are grouped on the basis of the protruding portion diameter Dw, and an approximation linear line is added for each group. From this graph, the first tensile stress Fa is proportional to the protruding portion thickness Dg, and the relationship therebetween can be represented by the following expression.

$$Fa = A*Dg \quad (1a\text{-}1)$$

Fa: first tensile stress (MPa), Dg: protruding portion thickness (mm) of suction hole sealing metal material 15

Here, A is the proportionality coefficient (first proportionality coefficient) in Expression (1a-1).

From FIG. 8A, it is found that the first proportionality coefficient A is determined by the protruding portion diameter Dw.

FIG. 8B is a graph obtained by plotting values of the protruding portion diameter Dw and values of the first proportionality coefficient A corresponding thereto. Further, these plotted points are grouped on the basis of the glass plate thickness Tg, and an approximation linear line is added for each group. From this graph, the first proportionality coefficient A is proportional to the protruding portion diameter Dw, and the relationship therebetween can be represented by the following expression.

$$A = B*Dw \quad (1a\text{-}2)$$

A: first proportionality coefficient, Dw: protruding portion diameter (mm) of suction hole sealing metal material 15

Here, B is the proportionality coefficient (second proportionality coefficient) in Expression (1a-2).

From FIG. 8B, it is found that the second proportionality coefficient B is determined by the glass plate thickness Tg.

FIG. 8C is a graph obtained by plotting values of the glass plate thickness Tg and values of the second proportionality coefficient B corresponding thereto, and adding an approximation linear line. From this graph, the second proportionality coefficient B is proportional to the glass plate thickness Tg, and the relationship therebetween can be represented by the following expression.

$$B=(-0.0157Tg+0.1945) \quad (1a\text{-}3)$$

B: second proportionality coefficient, Tg: glass plate thickness (mm)

Thus, from FIGS. 8A to 8C and Expressions (1a-1) to (1a-3), the first tensile stress Fa is represented by the following Expression (1a).

$$Fa=(-0.0157Tg+0.1945)*Dw*Dg \quad (1a)$$

Tg: glass plate thickness (mm), Dw: protruding portion diameter (mm) of suction hole sealing metal material 15, Dg: protruding portion thickness (mm) of suction hole sealing metal material 15

Figure 9A:
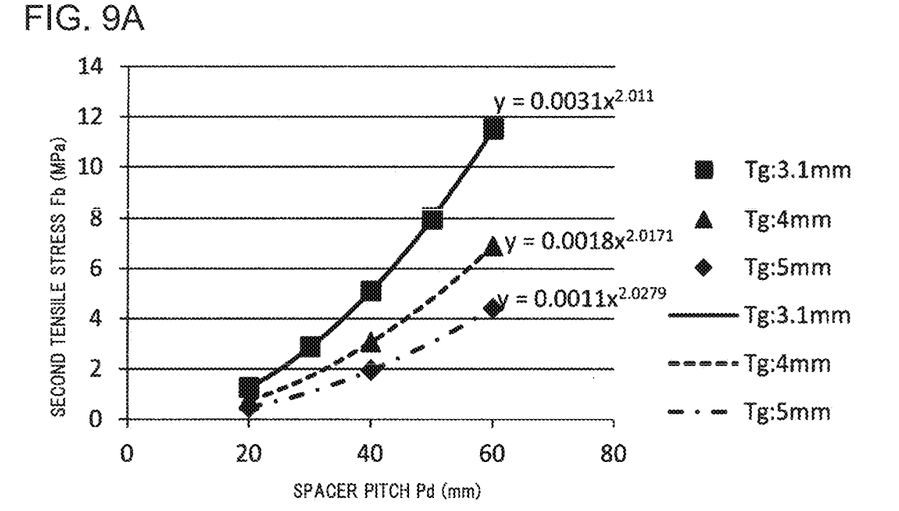
FIG. 9A is a graph showing the correlation between a spacer pitch Pd and second tensile stress Fb in simulation regarding second tensile stress Fb.
Figure 9B:
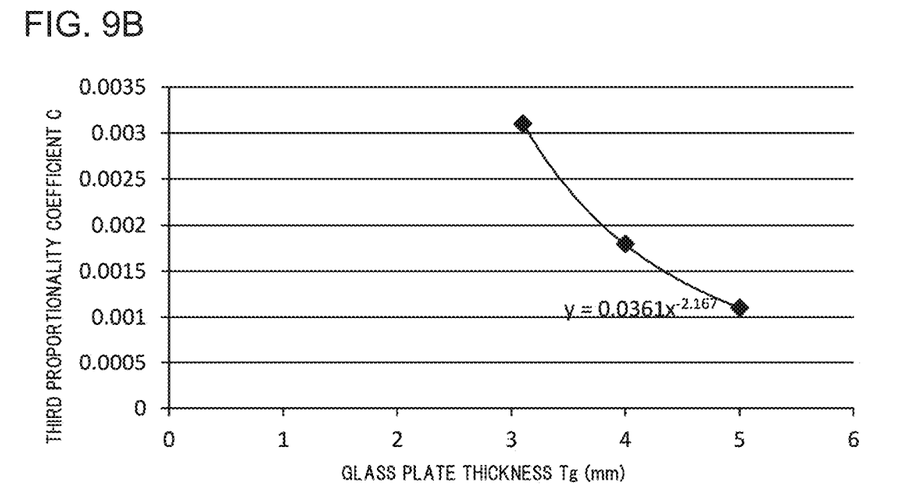
FIG. 9B is a graph showing the correlation between the glass plate thickness Tg and a third proportionality coefficient C in simulation regarding second tensile stress Fb.

On the other hand, FIGS. 9A and 9B show a result of simulation (nonlinear analysis using finite element method analysis software (Abaqus Ver6.11)) conducted by the present inventors for three cases with different glass plate thicknesses Tg, regarding the second tensile stress Fb. It is noted that the used glass plate thicknesses Tg (mm) were 3.1, 4, and 5.

FIG. 9A is a graph obtained by plotting values of the spacer pitch Pd and values of the second tensile stress Fb corresponding thereto. Further, the plotted points are grouped on the basis of the glass plate thickness Tg, and an approximation curved line is added for each group. From this graph, the second tensile stress Fb is determined by the value of the spacer pitch Pd, and the relationship therebetween can be represented by the following expression. It is noted that the exponent of the spacer pitch Pd is set to 2 by approximation.

$$Fb=C*Pd^2 \quad (1b\text{-}1)$$

Fb: second tensile stress (MPa), Pd: spacer pitch (interval) (mm)

Here, C is the proportionality coefficient (third proportionality coefficient) in Expression (1b-1).

From FIG. 9A, it is found that the third proportionality coefficient C is determined by the glass plate thickness Tg.

FIG. 9B is a graph obtained by plotting values of the glass plate thickness Tg and values of the third proportionality coefficient C corresponding thereto, and adding an approximation curved line thereto. From this graph, the relationship between the third proportionality coefficient C and the glass plate thickness Tg can be represented by the following expression. It is noted that the exponent of the glass plate thickness Tg is set to −2.2 by approximation.

$$C=0.0361*Tg^{-2.2}$$

C: third proportionality coefficient, Tg: glass plate thickness (mm)

Thus, from FIGS. 9A and 9B and Expressions (1b-1), (1b-2), the second tensile stress Fb is represented by the following Expression (1b).

$$Fb=0.0361Pd^2/Tg^{2.2} \quad (1b)$$

Fb: second tensile stress, Pd: spacer pitch (interval, mm), Tg: glass plate thickness (mm)

Using the above results, the following Expressions (1), (2) are derived.

$$Dw<=(Fc-0.0361Pd^2/Tg^{2.2})/\{(-0.0157Tg+0.1945)*Dg\} \quad (1)$$

$$Dg<=(Fc-0.0361Pd^2/Tg^{2.2})/\{(-0.0157Tg+0.1945)*Dw\} \quad (2)$$

Thus, by appropriately adjusting the protruding portion diameter Dw and the thickness Dg, it is possible to prevent breakage of the glass plate due to stress concentration.

With further consideration added on the safety index, the long-term permissible stress Fc at the edge portion of the glass plate is set to 7 MPa as described above. In addition, when the value of stress occurring on the gap side due to the atmospheric pressure was calculated through nonlinear analysis using finite element method analysis software (Abaqus Ver6.11), the second tensile stress Fb was approximately 2 MPa. Therefore, setting is made so as to satisfy first tensile stress Fa<=5 MPa. In addition, with the safety factor set to 2 or less, and further, in consideration of variation in stress, setting may be made so as to satisfy first tensile stress Fa<=3 MPa.

In the above expressions, Fc is uniquely determined by the material, and Tg is determined from the specifications. In view of heat insulation property, Pd is desired to be great, and is determined from the heat insulation specifications of the glass panel. Thus, it is difficult to control these elements. Therefore, by controlling the protruding portion thickness Dg and the diameter Dw, it is possible to prevent breakage of glass beforehand.

In the present embodiment, float glass is used and the long-term permissible stress Fc at the edge portion of the glass plate is 7 MPa. However, in the case of using tempered glass, it is possible to set Fc to 69 MPa at maximum. Depending on the tempering specifications, Fc can be adjusted in a range of 7 to 69 MPa. It is noted that, even with a numerical range including these values of Fc (in the case of float glass, Fc: 5 to 15 MPa; in the case of tempered glass, 50 to 80 MPa), the effects of the invention of the present application can be provided.

Other Embodiments

Other embodiments will be described below.

In other embodiments below, the same members as those in the above embodiment are denoted by the same reference characters.

Figure 10:
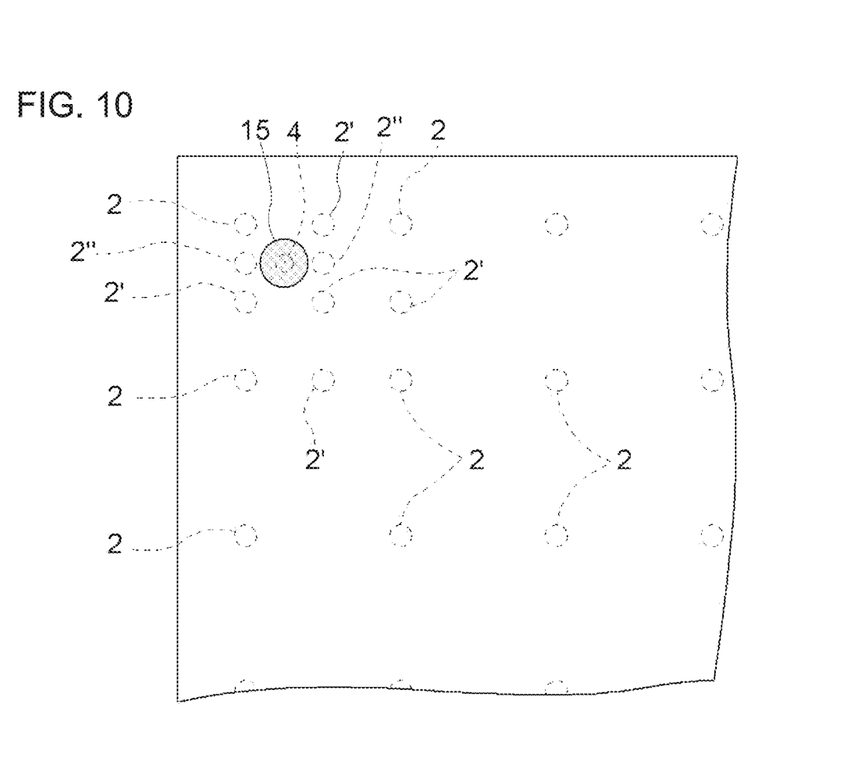
FIG. 10 is a plan view showing another embodiment of a glass panel.

(1) According to the above Expression (1b) (expression of Fb), the second tensile stress Fb is proportional to the square of the interval Pd of the pillars. Therefore, by reducing the interval of the pillars, it is possible to reduce stress concentration on the edge 4e. On the basis of this principle, in an embodiment shown in FIG. 10, intermediate pillars 2' are provided at positions corresponding to half the intervals of the normal pillars 2, whereby the second tensile stress Fb is reduced. Thus, larger first tensile stress Fa is permissible, and therefore it becomes possible to make more reliable sealing by increasing the protruding portion diameter Dw.

(2) In the above other embodiment (1), intermediate pillars 2' with short arrangement intervals are used as spacers, thereby reducing the second tensile stress Fb occurring on the gap side around the suction hole due to depressurization. Other than this, it is possible to adopt various configurations for spacers, as long as the pillar interval around the suction hole 4 is shorter than the normal pillar interval. For example, in FIG. 10, instead of providing the intermediate pillars 2', other reinforcing pillars 2" may be provided. It is noted that the intermediate pillars 2' or the reinforcing pillars 2" may have the same shape as or a different shape from the normal pillars.

(3) In the above embodiments, the suction hole sealing metal material (solder) 15 is dropped and thereby solidified.

However, the suction hole sealing metal material 15 may be supplied by a method other than dropping, and then solidified.

(4) The coefficients in the expressions in the above embodiments are expressed with three significant digits in order to achieve more accurate calculation (for example, the coefficient of $Pd^2$ in Expression (1) is 0.0361). However, for convenience of calculation, the coefficients in the expressions may be expressed with two significant digits or one significant digit (for example, the coefficient of $Pd^2$ in Expression (1) becomes 0.036 or 0.04). In the claims, for convenience sake, expression with three significant digits is used, and thus the coefficients in the expressions include the case of two significant digits or one significant digit.

It is noted that, although the reference characters have been given for convenience of matching with the drawings as described above, such reference characters are not intended to limit the present invention to the configurations shown in the accompanying drawings. In addition, it should be naturally understood that various embodiments can be made without departing from the scope of the present invention.

INDUSTRIAL APPLICABILITY

The present invention is applicable as a glass panel having high thermal insulation performance. For example, the present invention is applicable as a thermal insulation glass panel required to have long-term durability for a door, a wall part, etc., of a building or a vehicle (window glass of an automobile, a rail road vehicle, a vessel, etc.) or of various devices such as a refrigerator and a heat insulating device.

DESCRIPTION OF THE REFERENCE CHARACTERS 1A, 1B glass plate
2 spacer (pillar)
2' intermediate pillar
2" reinforcing pillar
3 periphery sealing metal material (solder)
4 suction hole
4e edge
5 metal introduction device
6 surface plate
6a high portion
6b low portion
7 supply tower
8 introduction plate
8A bent portion
9 crucible portion
10 heat transfer heater
11 introduction path
12 rail member
13 movement mechanism
14 opened end part
15 suction hole sealing metal material (solder)
16 protruding portion
20 guide cylinder
V gap
VT peripheral portion
P glass panel
Fa first tensile stress
Fa1 solder contraction stress
Fa2 upper part compressive stress
Fb second tensile stress
Fb1 atmospheric pressure
Fc long-term permissible stress at glass edge
Dw protruding portion diameter of suction hole sealing metal material
Dg protruding portion thickness of suction hole sealing metal material
Tg glass plate thickness
Pd spacer pitch (interval)
Rw periphery sealing metal width
Sw suction hole diameter

The invention claimed is:

1. A glass panel comprising:
a pair of glass plates;
a gap formed by the pair of glass plates being disposed so as to be opposed to each other with a spacer interposed between the pair of glass plates; and
a periphery sealing metal material joining the pair of glass plates at a peripheral portion thereof so as to make the gap airtight, wherein
one glass plate of the pair of glass plates has a suction hole penetrating the one glass plate in a front-back direction thereof,
air in the gap is sucked so as to depressurize the gap, and the suction hole is sealed by a suction hole sealing metal material having a thermal expansion coefficient different from that of the pair of glass plates,
the suction hole sealing metal material keeps an airtight state on the suction hole,
the suction hole sealing metal material is formed concentrically with the suction hole in plan view, and
the following Expression (1) is satisfied:

$$Dw <= (Fc - 0.0361 Pd^2 / Tg^{2.2}) / \{(-0.0157 Tg + 0.1945) * Dg\} \quad (1)$$

where Tg is a glass plate thickness (mm), Dw is a protruding portion diameter (mm) of the suction hole sealing metal material, Dg is a protruding portion thickness (mm) of the suction hole sealing metal material, Pd is a spacer pitch (mm), and Fc is long-term permissible stress at a glass edge.

2. The glass panel according to claim 1, wherein
the protruding portion diameter Dw of the suction hole sealing metal material is fixed, and is set so as to satisfy the following Expression (2):

$$Dg <= (Fc - 0.0361 Pd^2 / Tg^{2.2}) / \{(-0.0157 Tg + 0.1945) * Dw\} \quad (2).$$

3. The glass panel according to claim 1, wherein
first tensile stress Fa is set so as to satisfy the following Expression (3):

$$Fa = (-0.0157 Tg + 0.1945) * Dw * Dg <= 5 \text{ MPa} \quad (3).$$

4. The glass panel according to claim 1, wherein
first tensile stress Fa is set so as to satisfy the following Expression (4):

$$Fa = (-0.0157 Tg + 0.1945) * Dw * Dg <= 3 \text{ MPa} \quad (4).$$

5. The glass panel according to claim 1, wherein
the suction hole sealing metal material is solidified by being dropped from above the suction hole, to keep the airtight state.

6. The glass panel according to claim 1, wherein
the spacer is composed of a plurality of pillars interposed in a matrix form at a predetermined pitch so as to keep a predetermined interval between the pair of glass plates, and
the pillars are arranged at a narrower pitch in a vicinity of the suction hole than a pitch at another part.

7. The glass panel according to claim 1, wherein
the spacer is composed of a plurality of pillars interposed in a matrix form at a predetermined pitch so as to keep a predetermined interval between the pair of glass plates, and
at least one other pillar different from the plurality of pillars is provided closer to the suction hole than the plurality of pillars.

8. The glass panel according to claim 1, wherein
a width of the periphery sealing metal material as seen in a thickness direction with respect to a plane of the glass panel is 1 to 10 mm.

9. The glass panel according to claim 1, wherein
a thickness of at least one of the pair of glass plates is 0.3 to 15 mm.

10. The glass panel according to claim 1, wherein
a width of the protruding portion is 2 to 30 mm.

11. The glass panel according to a claim 1, wherein
a thickness of the protruding portion is 0.1 to 20 mm.

12. The glass panel according to claim 1, wherein
a pitch of the spacer is 5 to 100 mm.

13. The glass panel according to claim 1, wherein
a diameter of the suction hole is 2 to 10 mm.

14. The glass panel according to claim 1, wherein
at least a lower edge portion of the suction hole is formed in a curved-surface shape or is chamfered.

* * * * *